(12) United States Patent
Park et al.

(10) Patent No.: US 12,093,155 B2
(45) Date of Patent: Sep. 17, 2024

(54) ALLOCATION OF DATA SUB-TENSORS ONTO HARDWARE SUB-ARRAYS

(71) Applicant: QUALCOMM Incorporated, San Diego, CA (US)

(72) Inventors: Hee Jun Park, San Diego, CA (US); Bohuslav Rychlik, San Diego, CA (US); Niraj Shantilal Paliwal, Nasik (IN)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/448,864

(22) Filed: Sep. 24, 2021

(65) Prior Publication Data

US 2023/0100036 A1    Mar. 30, 2023

(51) Int. Cl.
| | | |
|---|---|---|
| *G06F 11/30* | (2006.01) | |
| *G06F 7/544* | (2006.01) | |
| *G06F 9/50* | (2006.01) | |
| *G06F 11/07* | (2006.01) | |
| *G06N 3/048* | (2023.01) | |

(52) U.S. Cl.
CPC .......... *G06F 11/302* (2013.01); *G06F 7/5443* (2013.01); *G06F 9/5066* (2013.01); *G06F 11/0772* (2013.01); *G06N 3/048* (2023.01)

(58) Field of Classification Search
None
See application file for complete search history.

(56) References Cited

U.S. PATENT DOCUMENTS

| 11,113,601 B1 | 9/2021 | Xiao et al. |
|---|---|---|
| 2022/0122215 A1* | 4/2022 | Ray ..................... G06F 12/0866 |

OTHER PUBLICATIONS

International Search Report and Written Opinion—PCT/US2022/075580—ISA/EPO—Dec. 15, 2022.
Jang J-W., et al., "Sparsity-Aware and Re-configurable NPU Architecture for Samsung Flagship Mobile SoC", 2021 ACM/IEEE 48th Annual International Symposium on Computer Architecture (ISCA), IEEE, Jun. 14, 2021, pp. 15-28, XP033951936, 14 Pages, DOI:10.1109/ISCA52012.2021.00011, Abstract, Figures 2, 3, 4, 6, 7, Sections IV, V.

* cited by examiner

*Primary Examiner* — Eric C Wai
(74) *Attorney, Agent, or Firm* — Patterson & Sheridan LLP

(57) ABSTRACT

Certain aspects of the present disclosure provide techniques for improved hardware utilization. An input data tensor is divided into a first plurality of sub-tensors, and a plurality of logical sub-arrays in a physical multiply-and-accumulate (MAC) array is identified. For each respective sub-tensor of the first plurality of sub-tensors, the respective sub-tensor is mapped to a respective logical sub-array of the plurality of logical sub-arrays, and the respective sub-tensor is processed using the respective logical sub-array.

30 Claims, 10 Drawing Sheets

ALLOCATION OF DATA SUB-TENSORS ONTO HARDWARE SUB-ARRAYS

INTRODUCTION

Aspects of the present disclosure relate to efficient allocation of data to hardware for processing.

A wide variety of machine learning models (such as neural networks) require performing a large number of multiplications when processing data (both during training as well as during inferencing). For example, when passing a data tensor through a neural network, the tensor values are multiplied with the learned weights of the model. Similarly, when applying a convolution kernel in a convolutional neural network, the values specified in the kernel are multiplied appropriately by values in the input tensor (which may be an original input, or may be a feature tensor within the network).

In some systems, hardware units have been designed and deployed to efficiently perform these operations. For example, multiply-and-accumulate (MAC) arrays can be used to provide highly parallel computation, enabling the operations to be performed quickly and efficiently. However, significant issues exist with respect to unbalanced or non-uniform hardware conditions in the array.

Often, each portion of the MAC arrays operates on non-uniform workloads, causing some sections to age faster than others. This can lead to premature failure of the entire circuit (e.g., when one portion of the MAC array fails due to wear, even while other portions are undamaged). Conventional systems have attempted to address this concern by reducing the operating frequency of the entire MAC array, either permanently or when thermal issues are detected. This may prolong the life of the circuit, but significantly reduces performance and increases latency. Further, the heavily-used portions of the array will still age faster than the remaining array, shortening the lifetime and reliability of the circuit.

Accordingly, techniques are needed for processing data in a manner that allows more uniform hardware usage so that high performance may be maintained.

BRIEF SUMMARY

Certain aspects provide a method, comprising: dividing an input data tensor into a first plurality of sub-tensors; identifying a plurality of logical sub-arrays in a physical multiply-and-accumulate (MAC) array; and for each respective sub-tensor of the first plurality of sub-tensors: mapping the respective sub-tensor to a respective logical sub-array of the plurality of logical sub-arrays; and processing the respective sub-tensor using the respective logical sub-array.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
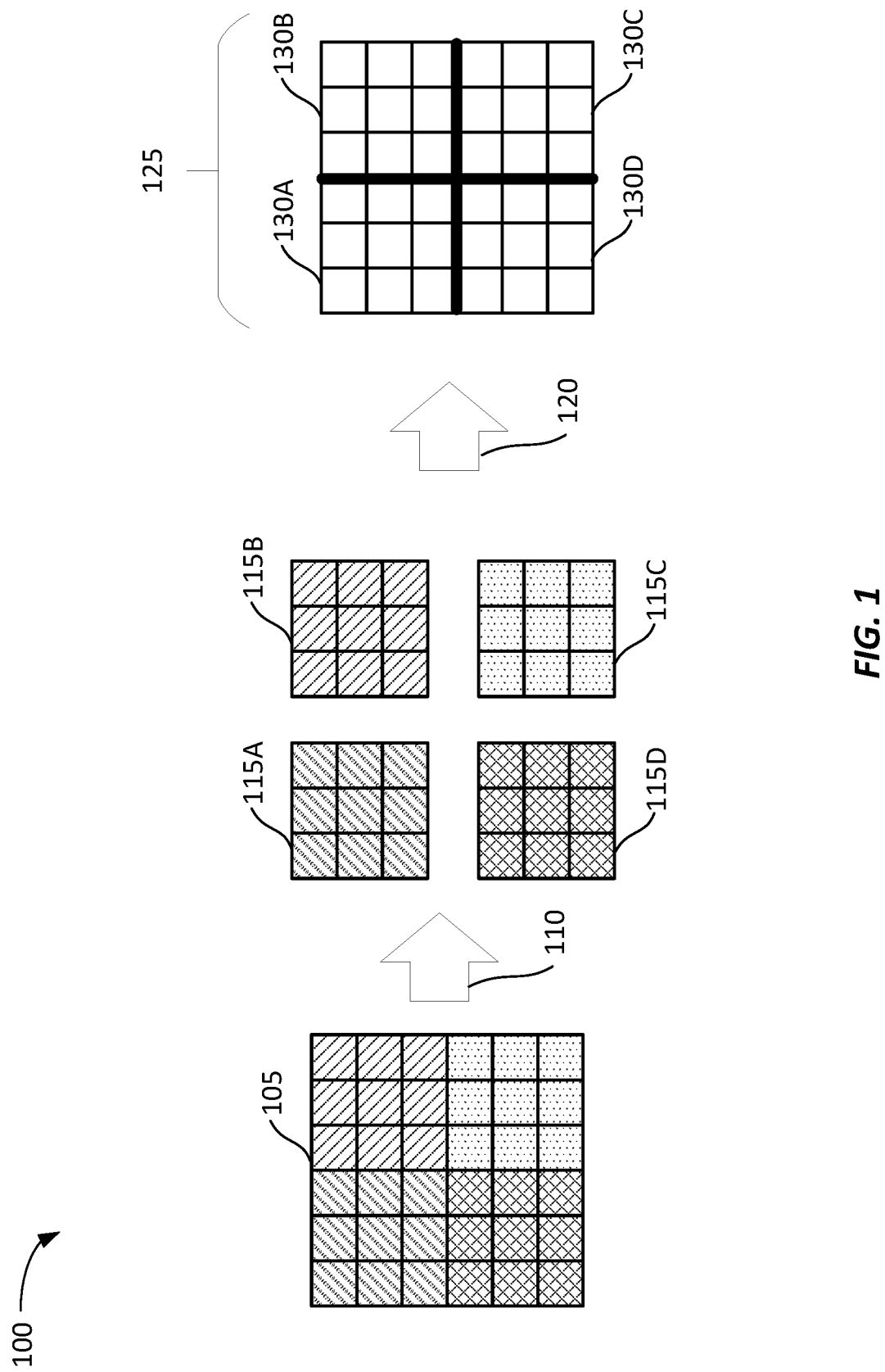
FIG. 1 depicts an example workflow for dividing and allocating data tensors to logical sub-arrays.

Aspects of the present disclosure provide techniques for improved data processing, including improved machine learning data processing, by allocating sub-tensors to individual logical sub-arrays in data processing hardware.

Frequently, a relatively small part of a hardware circuit (e.g., a portion of a MAC array) has higher use and thus higher power density compared to other areas of the same circuit, as the load across the array is generally not uniform. For example, in convolutional neural networks, some portion(s) of the MAC arrays are often used far more frequently than others. This may be because, for example, the input tensor or tile size is not the same as the physical MAC array size (leading to some portions to be entirely unused), because of the locality or distribution of sparsity in the input tensor (e.g., where some areas may tend to be more sparse than others), as well as differences between integer and floating point operations. As used herein, sparsity refers to the presence of elements with a value of zero in a tensor. Sparser tensors have more of these zero-value elements, as compared to less sparse (e.g., more dense) tensors. Although MAC arrays are used in some examples discussed herein, aspects of the present disclosure are readily applicable to a wide variety of data processing hardware.

Generally, non-uniform loads and power density can create thermal hot spots in relatively small areas inside the array if not remediated. In aspects of the present disclosure, data tensors (which may include input data tensors at the start of a model, feature tensors within a model, or weight tensors used to process the input and feature tensors, to name a few examples), can be divided into a set of sub-tensors. Further, the MAC array may be logically divided into sub-arrays. In some aspects, the sub-tensors can then be mapped onto the sub-arrays so as to improve load uniformity and reduce or eliminate thermal hotspots and uneven aging or damage of the array.

In aspects of the present disclosure, the tensors (and corresponding sub-tensors) can include any data. For example, one type of tensor is the original data tensor provided to a model. Another type is an activation tensor (e.g., within a model). Another type is a weight tensor. As used herein, a "tensor" may include any data tensors, including original input tensors, activation tensors, and weight tensors. Similarly, a "sub-tensor" may include a portion of any tensor, including original tensors, activation tensors, and weight tensors.

Mapping individual sub-tensors to different sub-arrays of a MAC array are discussed in some examples herein. In some aspects, the techniques described herein can also be used to allocate sub-tensors across differing arrays. For example, a given tensor may be delineated into a set of sub-tensors, and each sub-tensor may be mapped to a different sub-array on entirely different MAC arrays.

In some aspects, the sub-tensors are allocated to the sub-arrays using a fixed rotation, such that each sub-array operates on a different portion of input tensors during different iterations. Some such aspects using rotation-based allocation are described in more detail below with reference to FIGS. 2 and 6.

In some aspects, the sub-tensors are allocated to the sub-arrays based on various metrics associated with the sub-tensors, sub-arrays, or both. For example, the system may determine or estimate the load of each sub-tensor, as well as the age, wear or damage status, or heat state of each sub-array. The sub-tensors can then be mapped in a way that reduces uneven wear and thermal load, such as by allocating the sub-tensor with the largest load to the least-aged or coolest sub-array. Some such aspects using metric-based allocation are described in more detail below with reference to FIGS. 3 and 7.

In some aspects, the sub-tensors are allocated to the sub-arrays using a fixed interleaved pattern, such that adjacent portions of the input tensor are mapped to non-adjacent portions of the MAC array. This can reduce aging and thermal hot spots when some portion(s) of the input tensor are frequently heavier-loaded than others. Some such aspects using interleave-based allocation are described in more detail below with reference to FIGS. 4 and 6.

Accordingly, aspects described herein overcome conventional limitations with hardware utilization through allocation of sub-tensors onto individual sub-arrays. This sub-array allocation enables a wide variety of improvements to the system, including better thermal management and reduced hotspots, faster processing times (e.g., by reducing or eliminating operating speed reductions), reduced hardware damage, more uniform hardware wear, and the like.

Example Workflow for Dividing and Allocating Data Tensors to Logical Sub-Arrays

FIG. 1 depicts an example workflow 100 for dividing and allocating data tensors to logical sub-arrays.

In the illustrated workflow, a data tensor 105 is received as input. In aspects, the tensor 105 may be an original input to a model (e.g., input data at the first layer of a neural network), or may be a feature tensor within a model (e.g., activation data output by one layer of a neural network and used as input to a subsequent layer). In the illustrated example, the tensor 105 has a height and width of six. However, tensors of any size can be used in accordance with aspects of the present disclosure. Additionally, for conceptual clarity in the illustrated example, the tensor 105 has a depth of one. In aspects, however, the tensor 105 may have depths greater than one. That is, the tensor 105 may have any number of channels.

In the illustrated example, the tensor 105 is to be processed using an array 125 (e.g., a MAC array). In conventional systems, the input tensor 105 may simply be mapped directly to the entire MAC array 125. That is, if the MAC array 125 is sufficiently large (e.g., with dimensionality equal to or greater than the dimensionality of the input tensor 105), then the input tensor 105 may simply be mapped to the array 125 for processing. For example, the top-left element of the input tensor 105 will always be processed by the top-left element of the array 125, and so on.

In some conventional systems, if the array 125 is smaller than the tensor 105, then the tensor 105 may be tiled such that each tile can be separately processed by the array (or by separate arrays). For example, if the input tensor 105 has twenty-four elements in each spatial dimension, then the system may divide the tensor into four tiles (each with a height and width of six), and process each tile separately using the six-by-six array 125.

However, as discussed above, this simple mapping can introduce significant non-uniformity in actual use of circuit elements (such as memory cells and supporting circuit elements in compute-in-memory-based data processors), which causes unbalanced wear and thermal load on the array 125. For example, suppose the input tensor 105 (or some tile therefrom) is smaller than the MAC array 125. In conventional systems, some elements in the array 125 (e.g., the right-most elements and/or the bottom-most elements) would remain unused, leading to obvious imbalance.

Similarly, suppose some elements or regions of the input tensor 105 tend to be less sparse than others. That is, suppose all of the input tensors to the layer tend to be sparse in some areas (e.g., around the edges of the tensor) and dense in others (e.g., near the center of the tensor). For example, in an image-classification task, the input images may be likely to include more important and relevant information near their centers. Generally, processing a sparse region or element (e.g., with a value of zero in one or more elements) consumes less power, generates less heat, and introduces less wear as compared to processing a denser region (with more non-zero values). Thus, in conventional systems that simply map the tensor 105 directly only to array 125, the denser regions (e.g., the center elements) of the array 125 will heat more and wear more rapidly, as compared to the sparser regions (e.g., the edge elements).

In aspects of the present disclosure, as illustrated by operation 110, the system can therefore divide or delineate the tensor 105 into a set of sub-tensors 115A-D (collectively sub-tensors 115). In the illustrated example, the system divides the tensor 105 into four sub-tensors (one for each quadrant of the input tensor 105). In various aspects, however, the tensor 105 may be divided into any number of sub-tensors. Although not depicted in the illustrated example, in some aspects, each channel of the tensor 105 can be similarly divided into a respective set of sub-tensors. In another aspect, each sub-tensor 115 may have a depth equal to the original depth of the tensor 105, and may include the relevant elements in each channel.

In the illustrated workflow 100, the physical hardware array 125 (e.g., a MAC array) is logically delineated into a set of sub-arrays 130A-D (collectively sub-arrays 130). In the illustrated example, the array 125 is delineated into four sub-arrays 130A-D, one for each quadrant of the array 125. In various aspects, however, the array 125 may be divided into any number of sub-arrays. In some aspects, the array 125 is delineated into a set of sub-arrays 130 to match the sub-tensors 115 from the tensor 105 (or vice versa). That is, in some aspects, the tensor 105 and array 125 may each be delineated such that there are an equal number of sub-tensors 115 and sub-arrays 130. Similarly, in some aspects, the tensor 105 and array 125 may each be delineated such that the sub-tensors 115 and sub-arrays 130 are each the same dimensionality.

As illustrated by operation 120, the sub-tensors 115 can then be individually mapped or allocated to the sub-arrays 130 in a variety of ways, such that the processing load is more uniformly distributed across the array 125 over time. That is, as subsequent input tensors are processed, they are each delineated into sub-tensors and each sub-tensor is allocated to a sub-array in a way that promotes uniformity. In contrast, conventional systems simply map the tensor 105 directly to the array 125 (e.g., such that the elements in the sub-tensor 115A are always processed by the elements in the sub-array 130A, the elements in the sub-tensor 115B are always processed using the elements in the sub-array 130B, and so on).

In some aspects, the operation 120 includes mapping the sub-tensors 115 to the sub-arrays 130 using a defined configuration, such as a rotation (e.g., where each sub-tensor 115 is assigned to a different sub-array 130 in sequential processing iterations, such as sequential MAC operations). That is, for a first iteration using a first tensor 105 as input, the sub-tensor 115A may be mapped to the sub-tensor 130A. In a subsequent iteration for a second tensor 105, the sub-tensor 115A may be mapped to the sub-array 130B. One example of such a rotating assignment is discussed in more detail below with reference to FIG. 2.

In some aspects, the defined configuration of the operation 120 includes a fixed interleaved allocation, where one or more adjacent elements in the input tensor 105 are mapped to non-adjacent elements in the array 125. Though such an allocation may be static (e.g., in that it does not change between input tensors), it can nevertheless reduce non-uniform aging because it improves uniformity of the distribution of the sparsity in the tensor. One example of such an interleaved assignment is discussed in more detail below with reference to FIG. 4.

In some aspects, the operation 120 includes a load-based allocation, where the sub-tensors 115 are mapped to sub-arrays 130 based at least in part on metrics that are collected or estimated for each sub-tensor 115, sub-array 130, or both. For example, the system may estimate the load of each sub-tensor 115 (e.g., based on the sparsity of the sub-tensor and/or the sparsity of the corresponding weights), and allocate the sub-tensors based on these estimated loads.

In some aspects, the system can similarly determine or estimate various metrics of the sub-arrays 130 (such as the current or historical thermal state, wear or damage state, and the like) and allocate the sub-tensors based on these metrics. For example, the system may assign the more complex sub-tensors (associated with a higher estimated load) to sub-arrays that are cooler or have a lower estimated age or damage. Sub-tensors with lower estimated loads can be allocated to the hotter or more aged/damaged sub-arrays. One example of such a metric-based assignment is discussed in more detail below with reference to FIG. 3.

Generally, by allocating sub-tensors 115 to sub-arrays individually, aspects of the present disclosure enable more uniform aging, wearing, or damage on the array 125, reduce thermal gradient between portions of the array 125, and generally improve the reliability and longevity of the array 125. Further, by enabling more uniform thermal gradients, the system can reduce downtime of the array 125. That is, while existing systems may reduce the operating frequency of the entire array (e.g., using it every other clock cycle) to allow hotspots to dissipate, aspects of the present disclosure can enable the array 125 to be used more consistently, as the heat is more evenly distributed across the array and hotspots are less intense or entirely absent. This increased operating frequency can significantly reduce the latency of the system, as compared to conventional systems that may throttle the arrays more aggressively. As discussed above, this reduced latency results in more data being processed in the same (or less) amount of time, meaning that the machine learning model (or other computing task) operates more rapidly.

Figure 2:
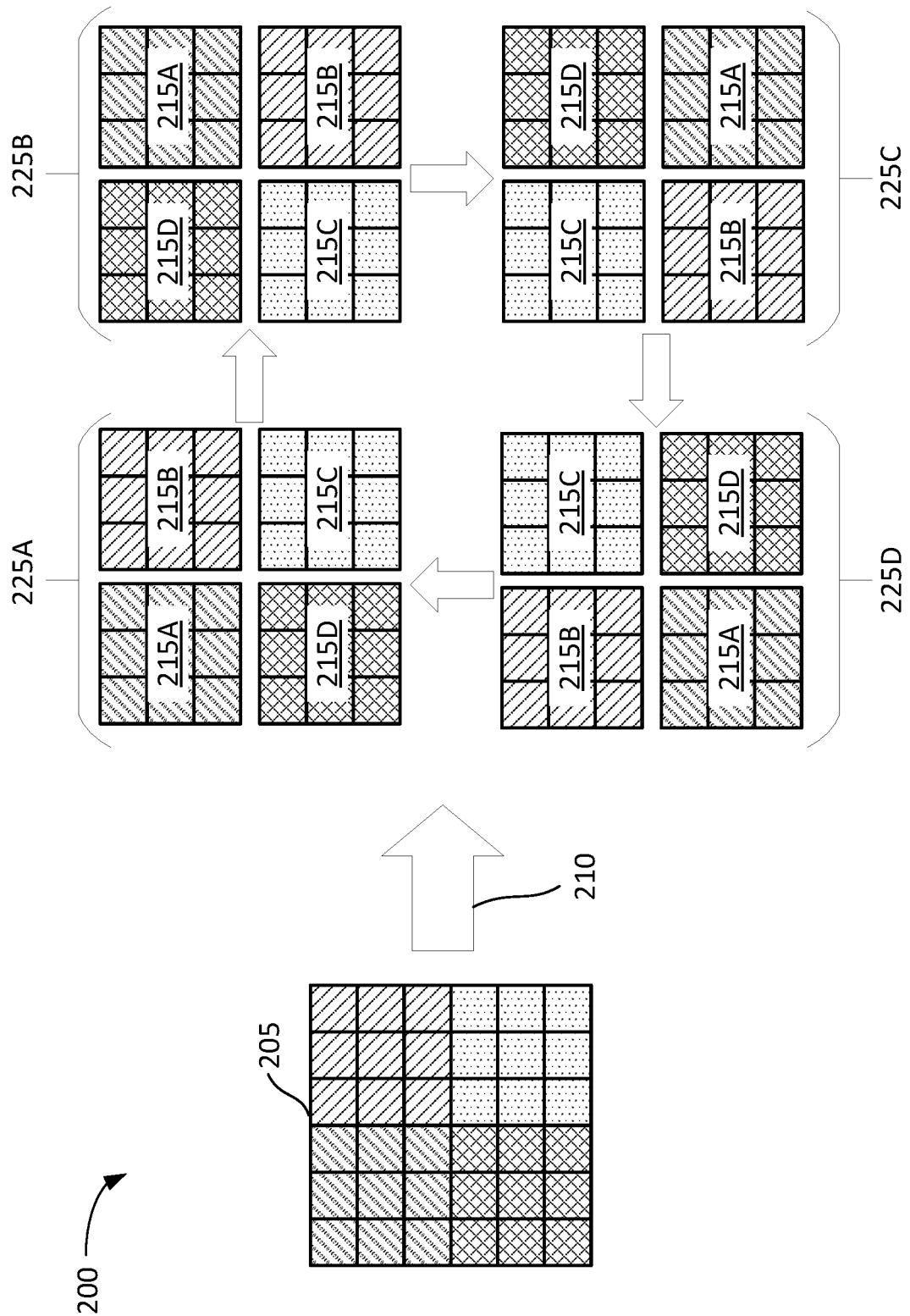
FIG. 2 depicts an example workflow for allocating sub-tensors to sub-arrays using defined rotations.

Example Workflow for Allocating Sub-Tensors to Sub Arrays using Defined Rotations FIG. 2 depicts an example workflow 200 for allocating sub-tensors to sub-arrays using defined rotations.

In the illustrated example, a tensor 205 is delineated into four sub-tensors, as indicated by the different cross-hatching patterns. The allocation operation 210 in the illustrated workflow 200 can be used to rotate the sub-tensors to different sub-arrays for sequential tensor operations. For example, each time an input tensor is received (e.g., each time an input tensor is passed through the model) for processing, the system may use the next rotation to allocate the sub-tensors of the input.

As illustrated, the workflow 200 uses a set of four rotations 225A-D. These rotations 225 ensure that each sub-tensor 215 from the tensor 205 is processed using a different part of the MAC array in subsequent iterations. For example, in the first rotation 225A (e.g., when the first tensor 205 is received), the first sub-tensor 215A is processed using the upper-left sub-array, the second sub-tensor 215B is processed using the upper-right sub-array, the third sub-tensor 215C is processed using the lower-right sub-array, and the fourth sub-tensor 215D is processed using the lower-left sub-array.

As illustrated, for the second rotation 225B (e.g., when a second or subsequent tensor 205 is received), the first sub-tensor 215A is processed using the upper-right sub-array, the second sub-tensor 215B is processed using the lower-right sub-array, the third sub-tensor 215C is processed using the lower-left sub-array, and the fourth sub-tensor 215D is processed using the upper-left sub-array.

In the third rotation 225C (e.g., for when a third tensor 205 is received), the first sub-tensor 215A is processed using the lower-right sub-array, the second sub-tensor 215B is processed using the lower-left sub-array, the third sub-tensor 215C is processed using the upper-left sub-array, and the fourth sub-tensor 215D is processed using the upper-right sub-array.

Finally, in the fourth rotation 225D (e.g., for when a fourth tensor 205 is received), the first sub-tensor 215A is processed using the lower-left sub-array, the second sub-tensor 215B is processed using the upper-left sub-array, the third sub-tensor 215C is processed using the upper-right sub-array, and the fourth sub-tensor 215D is processed using the lower-right sub-array. In the illustrated workflow 200, after the rotation 225D, the system returns to the first rotation 225A.

In this way, because the allocations change with the rotations 225 each time a new tensor 205 is received, the same position in the input tensors (e.g., the center elements) are processed using different MAC elements for each iteration. As these allocations rotate, the load on the MAC array tends to balance and become more uniform. This can significantly reduce hotspots, as well as uneven aging, wear, or damage on the array.

Although a fixed rotation is depicted, in some aspects, the system may use other sequences of allocations. That is, rather than rotating the allocations, the system may follow a defined sequence of allocations between sub-tensors and sub-arrays, moving to the next allocation each time a new tensor is received for processing. Additionally, in some aspects, the system may use random or psuedo-random allocations. For example, each time a new tensor 205 is received, the system may randomly or psuedo-randomly map each sub-tensor to a sub-array. Over time, these random (or psuedo-random) allocations will tend to result in more uniform array usage as compared to a fixed allocation of sub-tensors.

Figure 3:
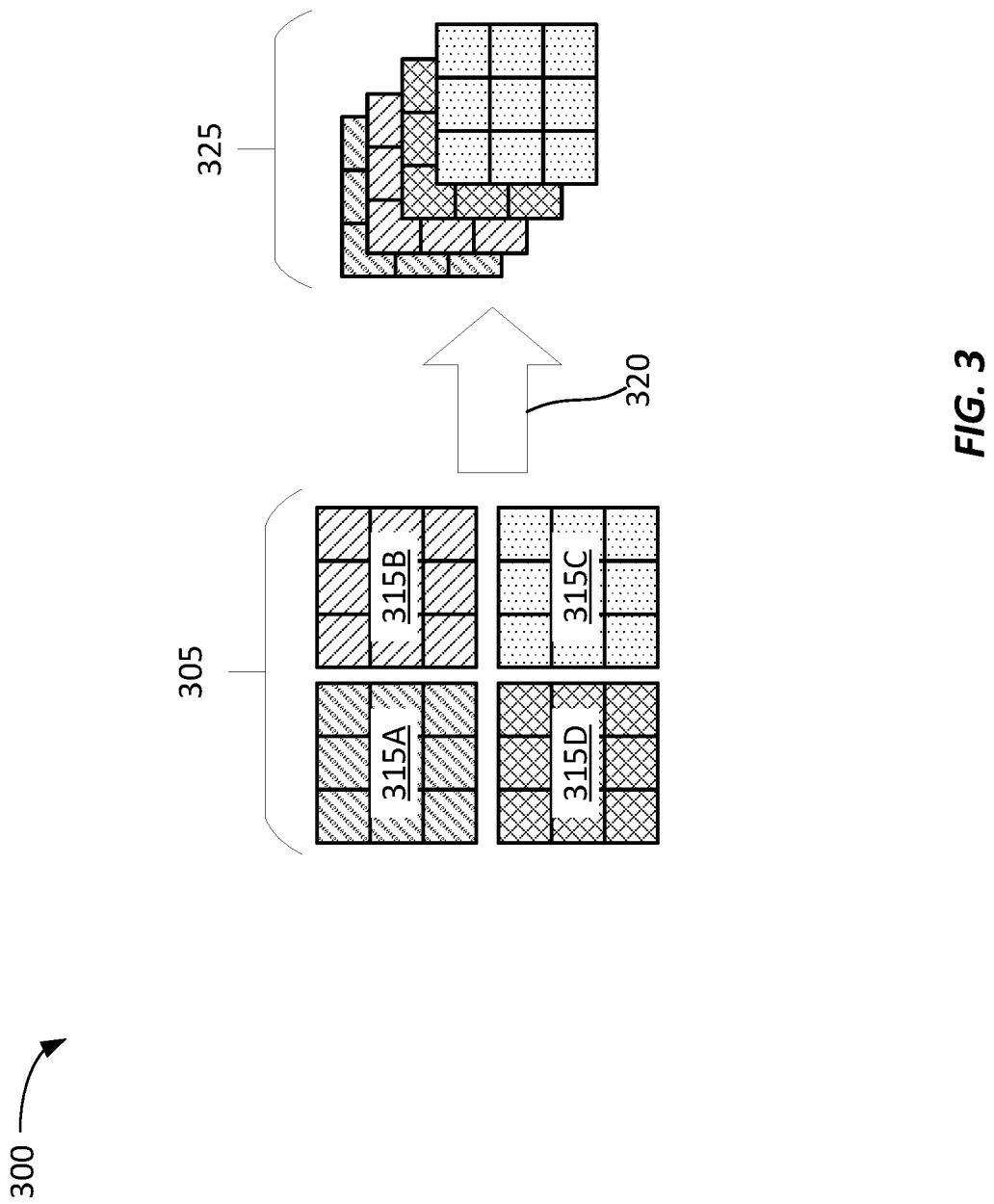
FIG. 3 depicts an example workflow for allocating sub-tensors to sub-arrays using estimated sub-tensor metrics.

Example Workflow for Allocating Sub-Tensors to Sub-Arrays using Estimated Sub-Tensor Metrics FIG. 3 depicts an example workflow 300 for allocating sub-tensors to sub-arrays using estimated sub-tensor metrics.

In the illustrated example, a tensor 305 is delineated into four sub-tensors 315A-D, as indicated by the differing cross-hatching patterns. As indicated by operation 320, the system may evaluate each of the sub-tensors 315 in order to determine one or more metrics or characteristics for each. These characteristics can be used to sort or otherwise order or allocate the sub-tensors 315A-D into an ordering 325 of ordered sub-tensors. In some aspects, the sub-tensors 315 are then allocated to sub-arrays based on this ordering 325.

In one aspect, the system may estimate or predict, for each respective sub-tensor 315, a respective load that will be placed on the MAC array when processing the respective sub-tensor 315. That is, the system may estimate how much wear will be caused, how much heat will be generated, and the like. The particular techniques used to estimate the load may vary depending on the particular implementation.

In some aspects, determining the predicted load can include determining the size or dimensionality of each sub-tensor 315. For example, larger sub-tensors will be processed using more elements of the sub-array (as compared to smaller sub-tensors), resulting in increased wear for these regions, increased power usage, and increased heat generation. In one aspect, therefore, the system may generate the ordering 325 by sorting the sub-tensors 315 by size.

In some aspects, determining the predicted load can include determining the sparsity or density of each sub-tensor 315 (e.g., determining the number of elements with a value of zero, or determining the number of non-zero elements). Generally, if an element has a value of zero, then processing it using the MAC array will draw little or no power. In contrast, elements with non-zero values will require power draw (and thereby generate heat) during the processing. That is, sub-tensors that are sparser may require less power and generate less heat during processing, as compared to sub-tensors that are denser. Thus, in one such aspect, the system generates the ordering 325 by sorting the sub-tensors 315 based on their sparsity.

In some aspects, determining the predicted load can include determining the sparsity or density of the weight tensor that will be used to process the input tensor 305. That is, if processing the tensor 305 involves multiplying the tensor 305 by a weight tensor (e.g., using a MAC array), then the system may evaluate the sparsity of the weight tensor to generate the ordering 325. For example, for each sub-tensor 315, the system may identify the corresponding sub-tensor in the weight tensor, and determine the number of elements with a value of zero (or determine the number of non-zero elements). In a similar manner to the above discussion, if a weight element has a value of zero, then processing it using the MAC array will draw little or no power. Activation sub-tensors that are multiplied by sparse weight sub-tensors may require less power and generate less heat during processing, as compared to activation sub-tensors that are associated with denser weight sub-tensors. Thus, in one such aspect, the system generates the ordering 325 by sorting the sub-tensors 315 based on the sparsity of the corresponding weight sub-tensors.

In some aspects, the system may use one or more of these techniques, as well as other metric-estimation techniques, in order to generate the ordering 325. For example, the system may sort the sub-tensors based on a combination of the size of each sub-tensor, the sparsity of each sub-tensor, and the sparsity of the weight tensor. This can allow an accurate and informed understanding of the estimated or predicted load or cost of processing each sub-tensor 315.

Though not depicted in the workflow 300, in some aspects, a similar process may be followed to estimate or determine one or more metrics for each sub-array of the MAC array. For example, the system may determine or estimate the wear or damage state, or the aging state of each sub-array (e.g., how worn or close to failure each is), the thermal state of each sub-array (e.g., how hot each sub-array is), and the like. For example, the system may use a variety of temperature sensors to monitor the thermal state of the array (or of sub-portions thereof). The system can then allocate the ordered sub-tensors 315 to the sub-arrays based on these metrics.

For example, the system may allocate the heaviest sub-tensor (with the highest estimated load) to the sub-array that has the lowest metrics (e.g., the lightest wear state, coolest temperature, and the like). The next-heaviest sub-tensor can be allocated to the next-healthiest sub-array, and so on until all sub-tensors are allocated (e.g., until the lightest sub-tensor is assigned to the most damaged or hottest sub-array).

In some aspects, each time a new tensor 305 is received for processing, the system can perform this metric-based evaluation for each sub-tensor and/or each sub-array. In some aspects, rather than performing the evaluation for each individual iteration (e.g., for every new tensor), the system may do so more periodically (e.g., every fifth iteration, or every n milliseconds, or the like). In aspects, this metric-based allocation can enable the system to intelligently and dynamically balance the load on the MAC array, thereby significantly reducing thermal hotspots and increasing the longevity and reliability of the array.

Figure 4:
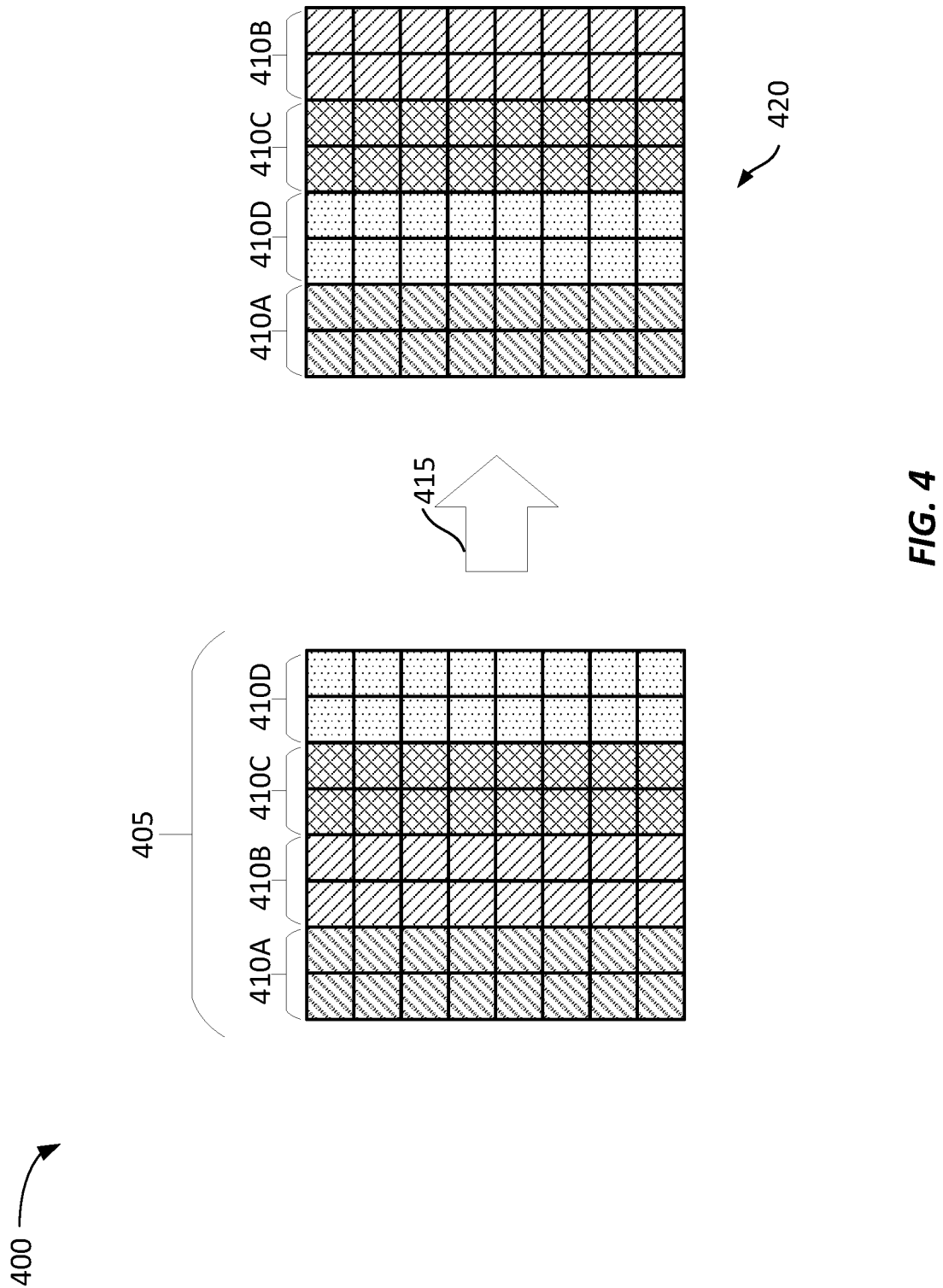
FIG. 4 depicts an example workflow for allocating sub-tensors to sub-arrays using defined interleaved patterns.

Example Method for Allocating Sub-Tensors to Sub-Arrays using Defined Interleaved Patterns FIG. 4 depicts an example workflow 400 for allocating sub-tensors to sub-arrays using defined interleaved patterns.

In the illustrated example, a tensor 405 is delineated into four sub-tensors 410A-D, as indicated by the cross-hatching patterns. The allocation operation 410 in the illustrated workflow 400 involves interleaving the sub-tensors 410 onto the sub-arrays of an array 420 for more uniform operations, such that at least some adjacent elements in the tensor 405 are mapped to non-adjacent elements in the array 420.

Specifically, in the illustrated example, the sub-tensors 410A and 410B are adjacent in the original input tensor 405. However, when mapped to sub-arrays on the array 420, the sub-tensors 410A and 410B are not adjacent. Instead, the sub-tensor 410A is adjacent to the sub-tensor 410D, and the sub-tensor 410B is adjacent only to the sub-tensor 410C.

In some aspects, this interleaved allocation may be fixed. That is, each sub-tensor 410 of each input tensor 405 may be mapped statically to a corresponding sub-array on the array 420. In other aspects, the interleaved arrangement may be dynamic and different for each iteration.

Generally, even when using a fixed interleaving pattern, the overall power and heat uniformity is improved as compared to the non-interleaved allocation of conventional systems. For example, suppose the center of the tensor 405 tends to include more non-zero values as compared to the edges. As discussed above, these regions will result in additional heat in the corresponding area(s) on the array 420. In the illustrated example, however, the center of the tensor 405 is split between non-adjacent areas of the array 420. This results in improved heat distribution, thereby leading to improved thermal dissipation, resulting in improved longevity and reliability of the array 420.

Example System for Processing Sub-Tensors using Sub-Arrays

Figure 5:
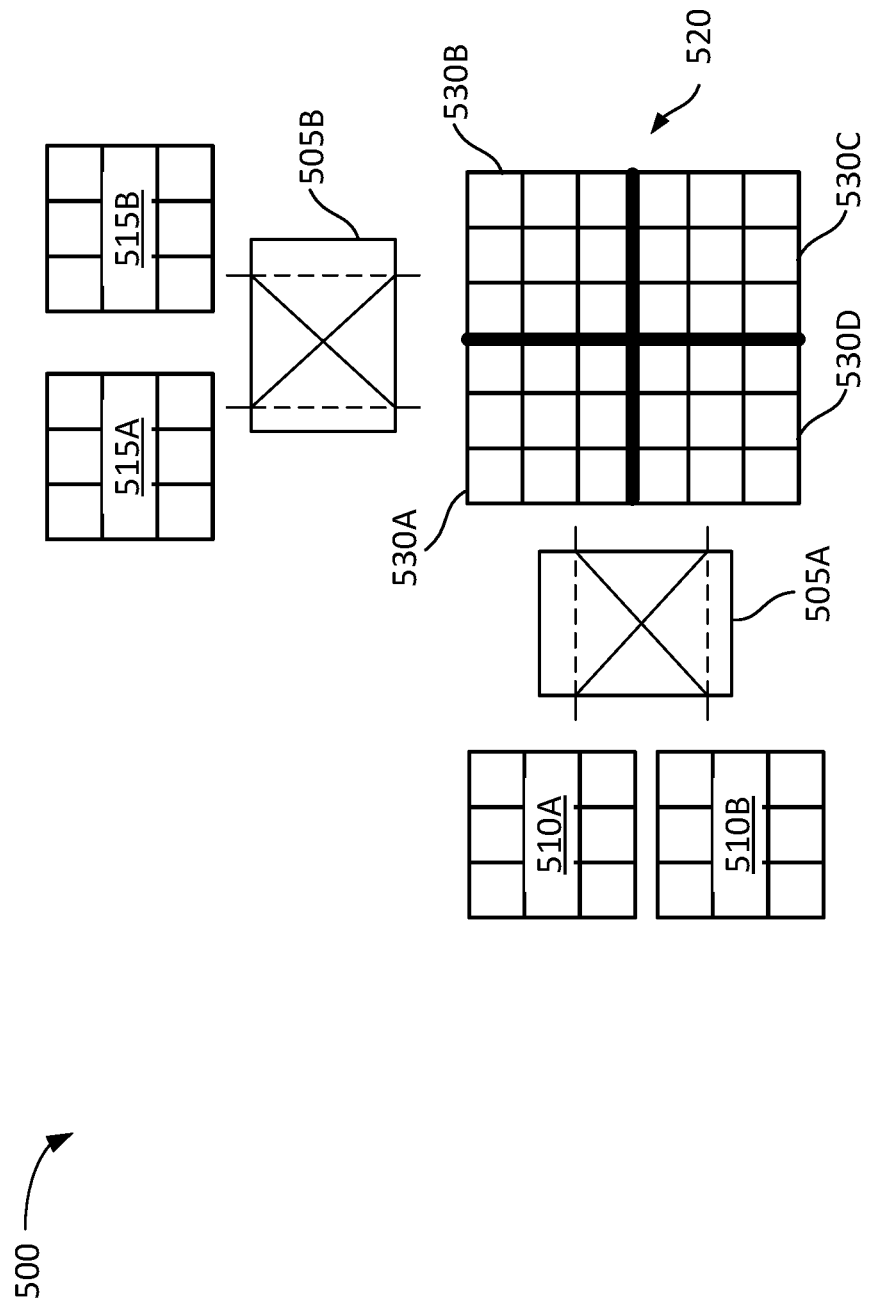
FIG. 5 depicts an example system for processing sub-tensors using sub-arrays.

FIG. 5 depicts an example system 500 for processing sub-tensors using sub-arrays. Specifically, the system 500 illustrates a method for providing each sub-tensor to the corresponding sub-array to which it has been mapped or allocated.

In some aspects, to process data using an array 520 (e.g., a MAC array), the data is placed in one or more buffers alongside the array. For example, in the illustrated system 500, activation data (represented by the sub-tensors 510A and 510B) may be placed in a buffer that feeds one side or axis of the array (e.g., the horizontal traces), while weight data (represented by sub-tensors 515A and 515B) is placed in a buffer that feed the perpendicular axis (e.g., the vertical traces). Each element in the array 520 is therefore at an intersection of an element from the activation data and an element from the weight data, and can be used to multiply these corresponding elements.

In conventional systems, the tensors can be placed in the buffers and applied directly to the array. In the illustrated example, a set of switches 505A and 505B are used to steer each sub-tensor to its assigned sub-array 530. In various aspects, the switches 505 may be software-based or hardware-based. For example, a software switch may programmatically change which buffer (or where in the buffer) data is loaded. That is, prior to loading the data into the buffer(s), the system may determine which sub-array was allocated to the sub-tensor, and use the switch 505 to ensure the sub-tensor is placed in the proper buffer (or buffer location).

In some aspects, a hardware switch (such as a crossbar switch) may be used either before or after the buffers. That is, a hardware switch may change which buffer the data is written to, or may change which sub-array that the data is provided to as it exits the buffer.

In the illustrated example, if both switches 505 are left in their default position, then the sub-tensor 510A will be multiplied with the sub-tensor 515A using the sub-array 530A. Similarly, the sub-tensor 510A will be multiplied with the sub-tensor 515B using the sub-array 530B, the sub-tensor 510B will be multiplied with the sub-tensor 515A using the sub-array 530D, and the sub-tensor 510B will be multiplied with the sub-tensor 515B using the sub-array 530C.

By selectively activating the switches 505, the system can change which sub-array processes each sub-tensor. For example, by changing the state of the switch 505A, the system can cause the sub-tensor 510A to be multiplied with the sub-tensor 515A using the sub-array 530D (rather than the sub-array 530A). In aspects, the switches 505 can be controlled by a variety of components depending on the particular implementation. For example, the memory controller, compiler, or other component may manage the switches 505 to drive each sub-tensor to the proper sub-array.

In some aspects of the present disclosure, therefore, a set of switches 505 can be used to provide each sub-tensor to the correct sub-array, based on the determined allocations. In some aspects (e.g., those using static allocations, such as interleaved allocations), the system may instead rely on a static configuration of the data paths.

In some aspects, the switches 505 can additionally or alternatively be used to enable more fine-grained response to array wear or failure. For example, in conventional approaches, the system may reduce the operational frequency of the entire array (e.g., using the array to process data only every other clock cycle) to allow heat to dissipate. Similarly, in conventional systems, if any area of the array fails, then the entire array can no longer be used to process data.

In some aspects of the present disclosure, the switches 505 can be used to prevent processing of data using any sub-arrays with issues or problems (e.g., aging or wear related issues, sub-arrays with excessive heat, failed sub-arrays, and the like), even while the remaining (healthy) sub-arrays continue to be used. This can significantly reduce the impact of such frequency throttling or sub-array failure.

For example, suppose the sub-array 530A and/or 530B has an issue such as a thermal hotspot and cannot be used until it cools. Conventional systems would cease to use the entire array 520 for at least some clock cycles. However, in the illustrated aspect, the switch 505A can be used to pass both the sub-tensor 510A and the sub-tensor 510B to the sub-arrays 530D and/or 530C in a serial manner (e.g., sequentially, with the sub-tensor 510A being processed first, and the sub-tensor 510B being processed on a subsequent clock cycle). Additionally or alternatively, the switch 505B can be used to pass both the sub-tensor 515A and the sub-tensor 515B to the sub-arrays 530B and/or 530C in a serial manner. This can allow the system to continue to process the data iteratively using the (healthy) sub-arrays while allowing the heat to dissipate on the problematic sub-arrays.

In addition to allowing the data processing to continue, by rotating the selection of sub-arrays, the heat can dissipate more rapidly as compared to conventional systems. That is, a conventional system may use the entire array (including sub-arrays with thermal hotspots) every other clock cycle, causing heat to continue to build in these areas. In contrast, the present disclosure enables the problematic sub-arrays to be entirely dormant for some time, allowing them to cool rapidly. This allows the system to return to using the entire array 520 more rapidly, as compared to conventional systems.

Moreover, if a sub-array 530 fails entirely, the switches 505 can allow the array 520 to continue to operate using the remaining sub-arrays, even when the (failed) sub-arrays are disabled or not used to process data.

Example Method for Processing Data Tensors to Reduce Hardware Aging

Figure 6:
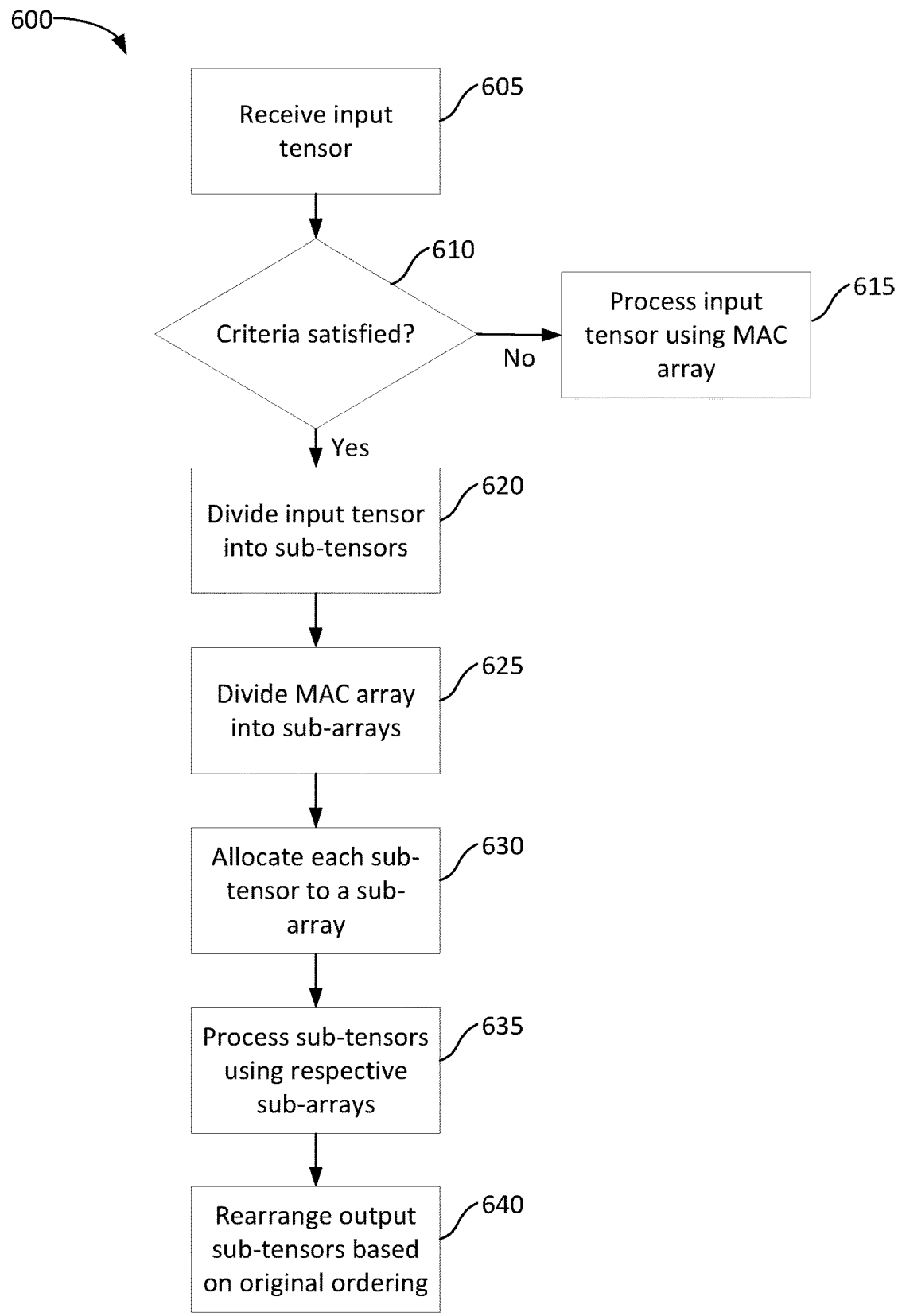
FIG. 6 depicts an example flow diagram illustrating a method for processing data tensors to reduce hardware aging.

FIG. 6 depicts an example flow diagram illustrating a method 600 for processing data tensors to reduce hardware aging. In one aspect, the method 600 may be performed by a computing system such as the processing system 1000 described below with reference to FIG. 10.

The method 600 begins at block 605, where an input tensor is received for processing using one or more hardware elements (such as a MAC array). For example, as discussed above, the input tensor may be activation data (e.g., a feature tensor) from a prior layer of a neural network.

At block 610, the system determines whether one or more criteria are satisfied. Generally, the criteria can include a wide variety of considerations, such as whether a user has enabled the sub-array allocation techniques described herein, whether the hardware is configured to support it (e.g., whether switches are available to route the sub-tensors) and the like.

In some aspects, the criteria include considerations for the condition(s) or state(s) of the hardware. In some such aspects, this may include a defined thermal state. For example, the system may determine whether the MAC array has any hotspots (which may be defined, for example, as areas that are hotter than some threshold temperature, or as areas that have some threshold thermal gradient between adjacent areas). In some aspects, monitoring the hardware conditions includes estimating or determining the aging or damage state for the array (either overall, or in particular sub-array locations).

In the illustrated example, if the system determines that the criteria are not satisfied (e.g., that there is no significant aging or thermal hotspots), then the method 600 continues to block 615, where the system processes the input tensor using the MAC array. That is, the system may use conventional techniques to process the tensor without sub-dividing it into sub-tensors and without sub-dividing the array into sub-arrays.

If, however, the system determines that one or more of the criteria are satisfied, the method 600 continues to block 620. At block 620, the system divides the input tensor into a set of sub-tensors, as discussed above.

At block 625, the system can similarly divide the MAC array into a set of logical sub-arrays, as discussed above.

The method 600 continues to block 630, where the system allocates each sub-tensor to a corresponding sub-array, as discussed above. For example, the system may use the workflow 200 (depicted in FIG. 2) to allocate the sub-tensors in a rotating manner, the workflow 300 (depicted in FIG. 3) to allocate the sub-tensors based on metrics of the tensor and/or array, the workflow 400 (depicted in FIG. 4) to interleave the sub-tensors, and the like.

At block 635, the system processes the sub-tensors using the assigned sub-arrays, as discussed above. For example, using switches such as those depicted in FIG. 5, the system may provide each sub-tensor to the appropriate or corresponding sub-array, enabling rapid and efficient processing.

Generally, processing each sub-tensor using the assigned sub-array results in generation of an output sub-tensor. Thus, processing the set of sub-tensors using the sub-arrays creates a set of output sub-tensors.

After the processing, at block 640, the system rearranges (or reorders) these output sub-tensors (generated by the processing) based on the original ordering of the sub-tensors from the input tensor. That is, the system can rearrange, reorder, or reorganize the output sub-tensors such that they match the ordering or arrangement of the original input tensor. This allows the method 600 to operate seamlessly without further changing the model or system architecture.

Although the illustrated example depicts using sub-tensor to sub-array allocation techniques only when some hardware-based criteria are satisfied, in some aspects, the system may use the techniques described herein for all operations, regardless of the current hardware state. This can further reduce non-uniform aging from the outset and improve longevity and reliability of the array.

Note that FIG. 6 is just one example of a method, and other methods including fewer, additional, or alternative steps are possible consistent with this disclosure.

Example Method for Allocating Sub-Tensors using Fixed Configurations

Figure 7:
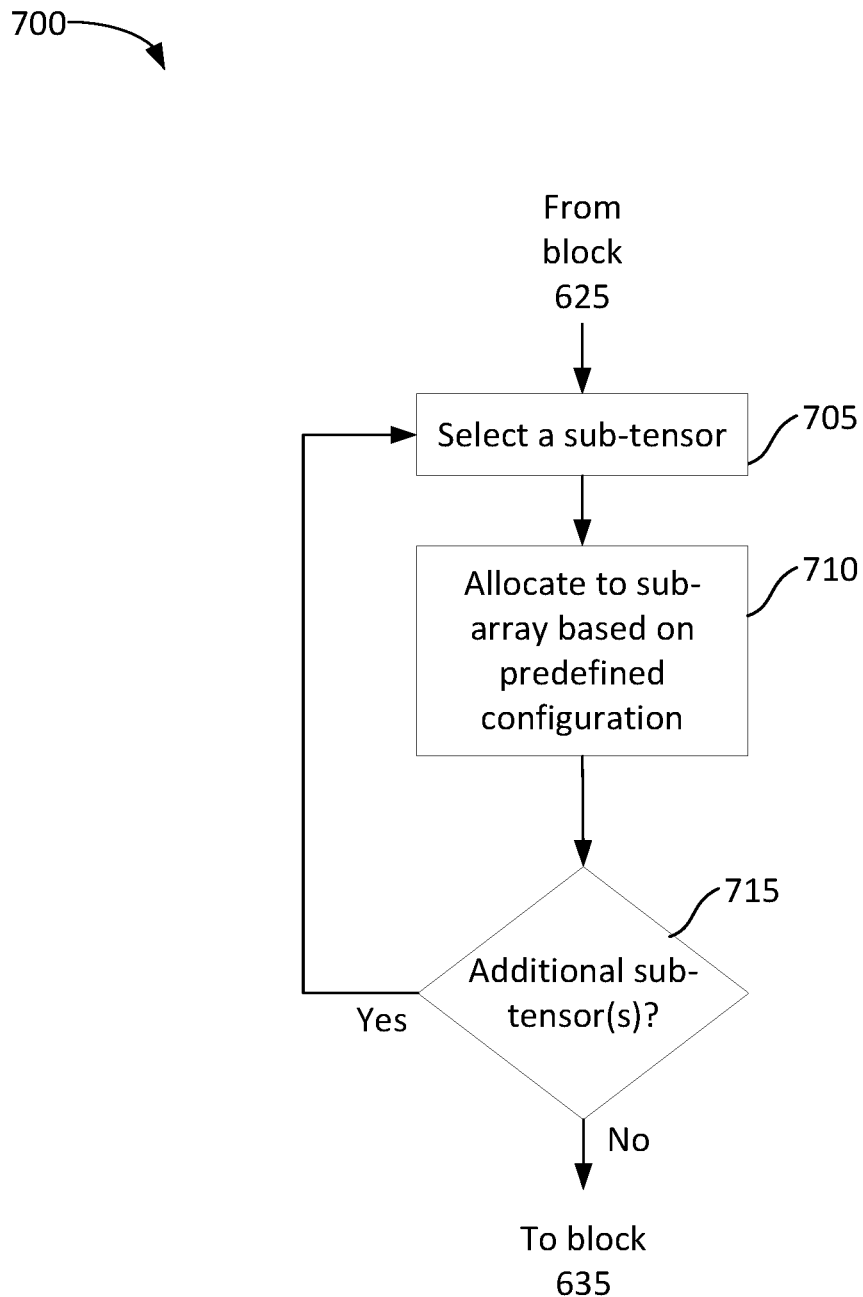
FIG. 7 depicts an example flow diagram illustrating a method for allocating sub-tensors using fixed configurations.

FIG. 7 depicts an example flow diagram illustrating a method 700 for allocating sub-tensors using fixed configurations. In the illustrated example, the method 700 provides additional detail for block 630 (allocating the sub-tensors) of FIG. 6. In one aspect, the method 700 may be performed by a computing system such as the processing system 1000 described below with reference to FIG. 10.

The method 700 begins at block 705, where the system selects one of the sub-tensors. Generally, this selection may be performed in any manner, as all sub-tensors will be processed using the method 700. Additionally, though the illustrated example depicts an iterative approach that processes each sub-tensor sequentially for conceptual clarity, in some aspects, some or all of the sub-tensors may be processed or evaluated in parallel.

At block 710, the system allocates the selected sub-tensor to a sub-array based on a predefined configuration. For example, in a system using rotating mappings (such as in the workflow 200 depicted in FIG. 2), the system may map the selected sub-tensor to the indicated sub-array in the current rotation. Similarly, in a system using fixed interleaved mappings (such as in the workflow 400 depicted in FIG. 4), the system may map the selected sub-tensor to the indicated sub-array in the interleaved assignment. Further, in a system using random allocations, the system may use a random number generator (either hardware or software) to randomly (or pseudo-randomly) allocate the sub-tensors.

At block 715, the system determines whether there is at least one additional sub-tensor that has not yet been allocated or mapped to a sub-array. If so, then the method 700 returns to block 705. If all sub-tensors have been assigned, then the method 700 terminates.

Note that FIG. 7 is just one example of a method, and other methods including fewer, additional, or alternative steps are possible consistent with this disclosure.

Example Method for Allocating Sub-Tensors using Dynamic Metric Estimations

Figure 8:
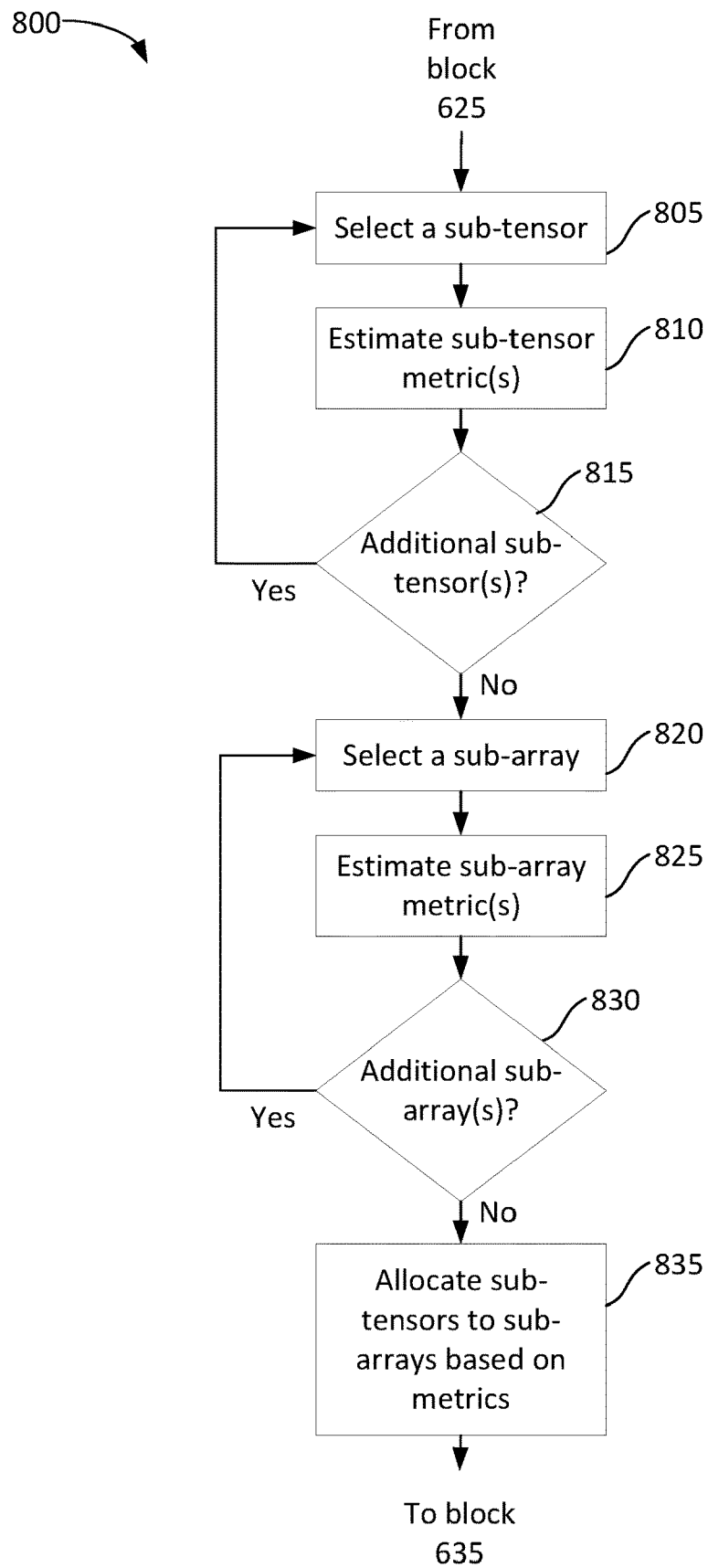
FIG. 8 depicts an example flow diagram illustrating a method for allocating sub-tensors using dynamic metric estimations.

FIG. 8 depicts an example flow diagram illustrating a method 800 for allocating sub-tensors using dynamic metric estimations. In the illustrated example, the method 800 provides additional detail for block 630 (allocating the sub-tensors) of FIG. 6. In one aspect, the method 800 may be performed by a computing system such as the processing system 1000 described below with reference to FIG. 10.

The method 800 begins at block 805, where the system selects one of the sub-tensors. Generally, this selection may be performed in any manner, as all sub-tensors will be processed using the method 800. Additionally, though the illustrated example depicts an iterative approach that processes each sub-tensor sequentially for conceptual clarity, in some aspects, some or all of the sub-tensors may be processed or evaluated in parallel.

At block 810, the system estimates one or more sub-tensor metrics. In some aspects, as discussed above, estimating the metric may include determining or estimating the load or weight of the selected sub-tensor, where the load or weight indicates the impact that processing the sub-tensor is likely to have on the hardware (e.g., in terms of heat generated). For example, as discussed above, sub-tensors with relatively less sparsity (e.g., more non-zero values) may have a higher load/weight as they will cause more heat to be generated, as compared to a relatively sparser sub-tensor with fewer non-zero values.

In addition to (or instead of) considering the sparsity of the sub-tensor, in some aspects, the metrics can include characteristics such as the sparsity of the corresponding portion of the weight tensor, the size or dimensionality of the sub-tensor, and the like.

At block 815, the system determines whether there is at least one additional sub-tensor that has not yet been evaluated. If so, then the method 800 returns to block 805. If all sub-tensors have been evaluated, then the method 800 continues to block 820. In some aspects, as discussed above, the sub-tensors can be ordered or sorted based on the determined or estimated metrics.

At block 820, the system selects one of the sub-arrays. Generally, this selection may be performed in any manner, as all sub-arrays will be processed using the method 800. Additionally, though the illustrated example depicts an iterative approach that processes each sub-array sequentially for conceptual clarity, in some aspects, some or all of the sub-arrays may be processed or evaluated in parallel.

At block 825, the system estimates one or more sub-array metrics. In some aspects, as discussed above, estimating the metric may include determining or estimating the age state, wear or damage state, thermal state, or other characteristics of the sub-array. For example, the system may use one or more temperature probes or sensors configured or arranged to determine the thermal state of the array at one or more points on the array. In some aspects, the system monitors for areas of high temperature (e.g., above a threshold). In a related aspect, the system may monitor for high thermal gradients on the array (e.g., where one area is significantly higher than an adjacent area) using one or more temperature sensors. In some aspects, the system can track the usage, thermal state, or both over time so as to estimate the wear or aging on each sub-array.

At block 830, the system determines whether there is at least one additional sub-array that has not yet been evaluated. If so, then the method 800 returns to block 820. If all sub-arrays have been evaluated, then the method 800 continues to block 835. In some aspects, as discussed above, the sub-arrays can be ordered or sorted based on the determined or estimated metrics.

At block 835, the system allocates the sub-tensors to the sub-arrays based on the determined metrics. In some aspects, the system performs this allocation by sorting the sub-tensors based on the metrics (e.g., in ascending order from least to most intense workload), and sorting the sub-arrays in the reverse order based on the metrics (e.g., in descending order from most to least aged, worn, or hot). This can allow the sub-tensors to be mapped directly to the sub-array in the corresponding place in the sorted list.

For example, as discussed above, the system may assign the sub-tensor with the "worst" metrics (e.g., the heaviest predicted load) to the sub-array with the "best" metrics (e.g., the lowest temperature, age, or wear state). Similarly, the "best" sub-tensor (e.g., with the lowest predicted load) can be assigned to the "worst" sub-array (e.g., with the highest temperature, age, or wear state). The remaining sub-tensors can similarly be allocated accordingly to their corresponding sub-arrays.

Note that FIG. 8 is just one example of a method, and other methods including fewer, additional, or alternative steps are possible consistent with this disclosure.

Example Method for Allocating Sub-Tensors to Sub-Arrays

Figure 9:
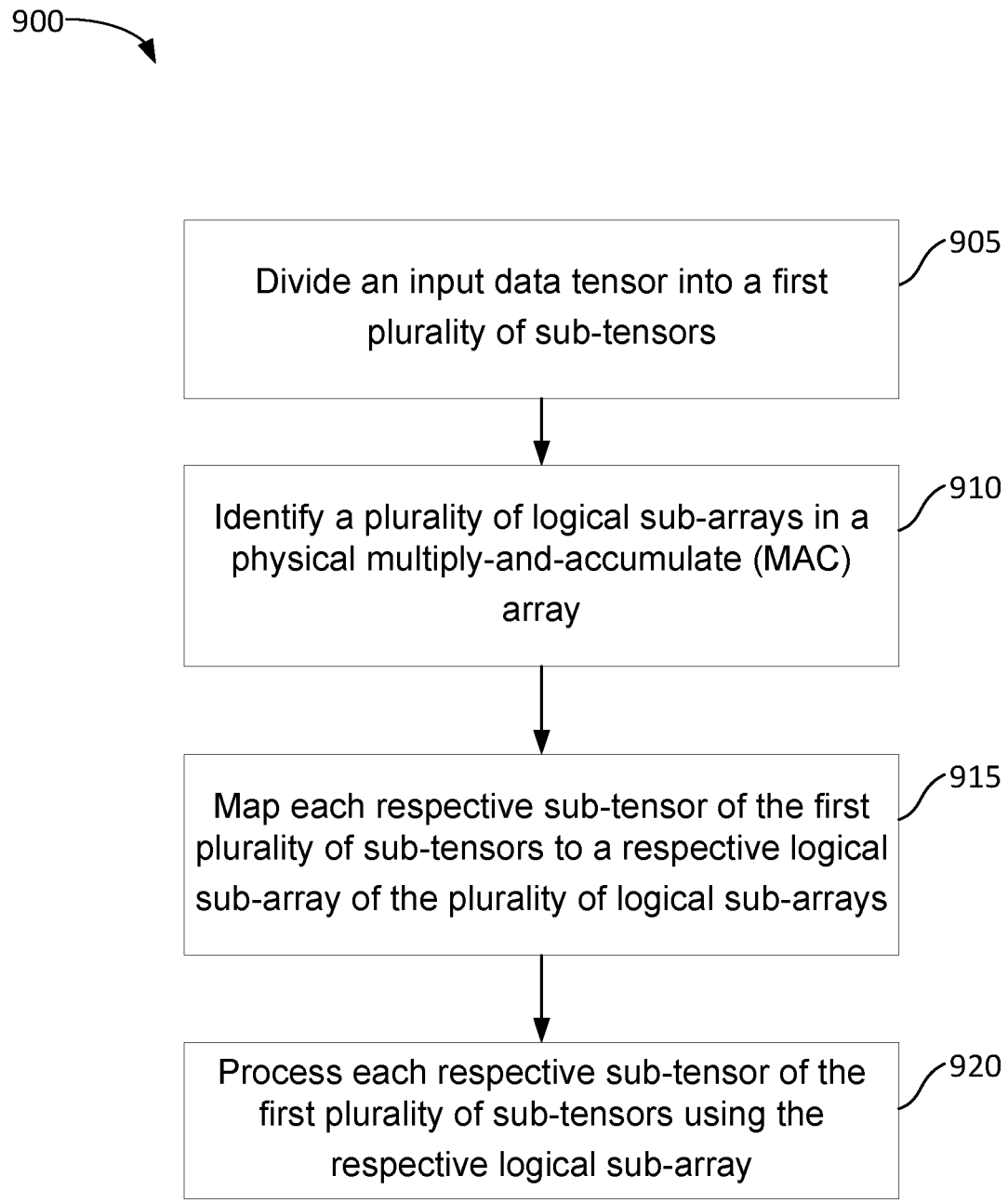
FIG. 9 depicts an example flow diagram illustrating a method for allocating sub-tensors to sub-arrays.

FIG. 9 depicts an example flow diagram illustrating a method 900 for allocating sub-tensors to sub-arrays. In one aspect, the method 900 may be performed by a computing system such as the processing system 1000 described below with reference to FIG. 10.

At block 905, an input data tensor is divided into a first plurality of sub-tensors.

At block 910, a plurality of logical sub-arrays are identified in a physical multiply-and-accumulate (MAC) array.

At block 915, each respective sub-tensor of the first plurality of sub-tensors is mapped to a respective logical sub-array of the plurality of logical sub-arrays.

In some aspects, the method 900 further includes estimating a respective metric for each respective sub-tensor of the first plurality of sub-tensors, wherein mapping the first plurality of sub-tensors to the plurality of logical sub-arrays is performed based on the respective metric.

In some aspects, estimating the respective metric for each respective sub-tensor of the first plurality of sub-tensors comprises at least one of: determining a size of the respective sub-tensor; determining a number of non-zero inputs in the respective sub-tensor; or determining a number of non-zero inputs in a weight tensor used to process the respective sub-tensor.

In some aspects, the method 900 further includes determining a respective state of each respective logical sub-array of the plurality of logical sub-arrays, wherein mapping the first plurality of sub-tensors to the plurality of logical sub-arrays is performed further based on the respective states.

In some aspects, the respective states comprise at least one of: a thermal state of the respective logical sub-array; a damage state of the respective logical sub-array; or an aging state of the respective logical sub-array.

In some aspects, mapping the first plurality of sub-tensors to the plurality of logical sub-arrays is performed based on a rotating assignment of sub-tensors to sub-arrays.

In some aspects, mapping the first plurality of sub-tensors to the plurality of logical sub-arrays is performed based on a fixed assignment of sub-tensors to sub-arrays that interleaves non-adjacent sub-tensors of the first plurality of sub-tensors to adjacent logical sub-arrays of the plurality of logical sub-arrays.

At block 920, each respective sub-tensor of the first plurality of sub-tensors is processed using the respective logical sub-array.

In some aspects, the method 900 further includes dividing a weight tensor into a second plurality of sub-tensors, wherein processing the respective sub-tensor using the respective logical sub-array comprises multiplying a respective sub-tensor of the second plurality of sub-tensors and the respective sub-tensor using the respective logical sub-array.

In some aspects, the method 900 further includes for each respective sub-tensors of the first plurality of sub-tensors, loading the respective sub-tensor into a respective buffer associated with the respective logical sub-array prior to processing the respective sub-tensor using the respective logical sub-array.

In some aspects, the method 900 further includes for each respective sub-tensor of the first plurality of sub-tensors, providing the respective sub-tensor to the respective logical sub-array using a crossbar switch.

In some aspects, the method 900 further includes: identifying an issue in a first logical sub-array of the plurality of logical sub-arrays; refraining from using the first logical sub-array for one or more cycles; and using at least a second logical sub-array of the plurality of logical sub-arrays to process data during the one or more cycles.

In some aspects, the method 900 further includes identifying a failure in a first logical sub-array of the plurality of logical sub-arrays; and processing the first plurality of sub-tensors using one or more other logical sub-arrays of the plurality of logical sub-arrays in a serialized manner.

In some aspects, the method 900 further includes after processing each respective sub-tensor using the respective logical sub-array, rearranging output sub-tensors generated by the processing based on an original order of the plurality of sub-tensors in the input data tensor.

In some aspects, at least one sub-tensor of the first plurality of sub-tensors is mapped to a logical sub-array in a second MAC array.

Note that FIG. 9 is just one example of a method, and other methods including fewer, additional, or alternative steps are possible consistent with this disclosure.

Example Processing System for Sub-Tensor Allocation

Figure 10:
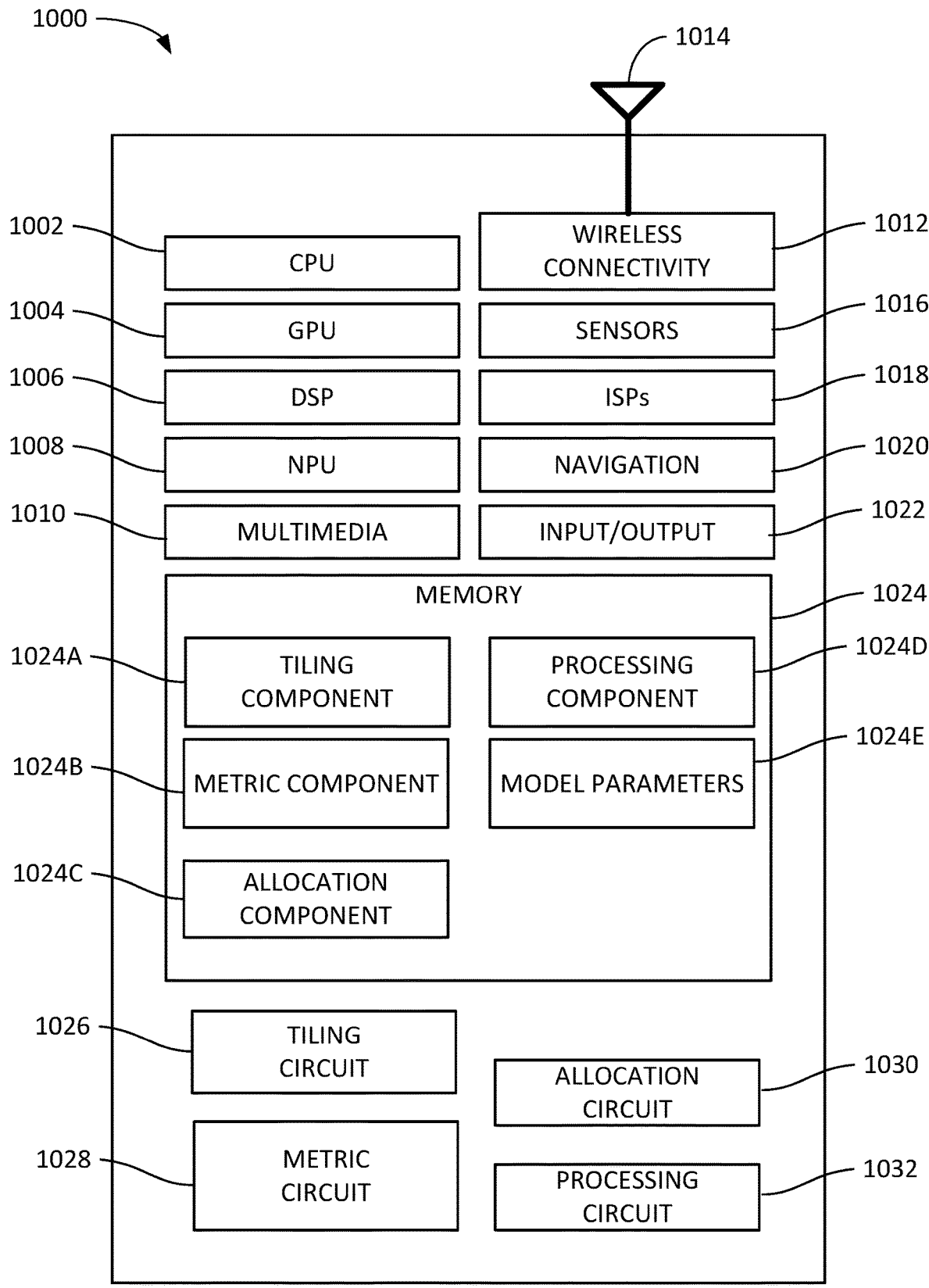
FIG. 10 depicts an example processing system configured to perform various aspects of the present disclosure.

In some aspects, the workflows, techniques, and methods described with reference to FIGS. 1-9 may be implemented on one or more devices or systems. FIG. 10 depicts an example processing system 1000 configured to perform various aspects of the present disclosure, including, for example, the techniques and methods described with respect to FIGS. 1-9.

Processing system 1000 includes a central processing unit (CPU) 1002, which in some examples may be a multi-core CPU. Instructions executed at the CPU 1002 may be loaded, for example, from a program memory associated with the CPU 1002 or may be loaded from a memory partition 1024.

Processing system 1000 also includes additional processing components tailored to specific functions, such as a graphics processing unit (GPU) 1004, a digital signal processor (DSP) 1006, a neural processing unit (NPU) 1008, a multimedia processing unit 1010, and a wireless connectivity component 1012.

An NPU, such as 1008, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 1008, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 1008 is a part of one or more of CPU 1002, GPU 1004, and/or DSP 1006.

In some examples, wireless connectivity component 1012 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 1012 is further connected to one or more antennas 1014.

Processing system 1000 may also include one or more sensor processing units 1016 associated with any manner of sensor, one or more image signal processors (ISPs) 1018 associated with any manner of image sensor, and/or a navigation processor 1020, which may include satellite-based positioning system components (e.g., GPS or GLONASS) as well as inertial positioning system components.

Processing system 1000 may also include one or more input and/or output devices 1022, such as screens, touch-sensitive surfaces (including touch-sensitive displays), physical buttons, speakers, microphones, and the like.

In some examples, one or more of the processors of processing system 1000 may be based on an ARM or RISC-V instruction set.

Processing system 1000 also includes memory 1024, which is representative of one or more static and/or dynamic memories, such as a dynamic random access memory, a flash-based static memory, and the like. In this example, memory 1024 includes computer-executable components, which may be executed by one or more of the aforementioned processors of processing system 1000.

In particular, in this example, memory 1024 includes a tiling component 1024A, a metric component 1024B, an allocation component 1024C, and a processing component 1024D. The memory 1024 also includes model parameters 1024E. The depicted components, and others not depicted, may be configured to perform various aspects of the techniques described herein. Though depicted as discrete components for conceptual clarity in FIG. 10, tiling component 1024A, metric component 1024B, allocation component 1024C, and processing component 1024D may be collectively or individually implemented in various aspects.

Processing system 1000 further comprises tiling circuit 1026, metric circuit 1028, allocation circuit 1030, and processing circuit 1032. The depicted circuits, and others not depicted, may be configured to perform various aspects of the techniques described herein. In some aspects, the processing circuit 1032 can include a compute-in-memory (CIM) array. In some aspects, the processing circuit 1032 can include a MAC array or a digital MAC array.

For example, tiling component 1024A and tiling circuit 1026 may be used to delineate input tensors into sub-tensors, as well as to delineate hardware arrays into logical sub-arrays. Metric component 1024B and metric circuit 1028 may be used to predict, determine, or estimate various metrics of the sub-tensors and sub-arrays, as discussed above. Allocation component 1024C and allocation circuit 1030 may be used to map or assign sub-tensors to sub-arrays, as discussed above. Processing component 1024D and processing circuit 1032 may be used to route the data (sub-)tensors to the allocated sub-array (e.g., using the switches discussed above with reference to FIG. 5), and to process the data (sub-)tensors (such as by multiplying the input tensors with weight tensors using one or more MAC arrays). The model parameters 1024F can include trainable parameters (such as weights or convolution kernels).

Though depicted as separate components and circuits for clarity in FIG. 10, tiling circuit 1026, metric circuit 1028, allocation circuit 1030, and processing circuit 1032 may collectively or individually be implemented in other processing devices of processing system 1000, such as within CPU 1002, GPU 1004, DSP 1006, NPU 1008, and the like.

Generally, processing system 1000 and/or components thereof may be configured to perform the methods described herein.

Notably, in other aspects, aspects of processing system 1000 may be omitted, such as where processing system 1000 is a server computer or the like. For example, multimedia component 1010, wireless connectivity 1012, sensors 1016, ISPs 1018, and/or navigation component 1020 may be omitted in other aspects. Further, aspects of processing system 1000 maybe distributed between multiple devices.

Example Clauses

Clause 1: A method, comprising: dividing an input data tensor into a first plurality of sub-tensors; identifying a plurality of logical sub-arrays in a physical multiply-and-accumulate (MAC) array; and for each respective sub-tensor of the first plurality of sub-tensors: mapping the respective sub-tensor to a respective logical sub-array of the plurality of logical sub-arrays; and processing the respective sub-tensor using the respective logical sub-array.

Clause 2: The method according to Clause 1, further comprising: dividing a weight tensor into a second plurality of sub-tensors, wherein processing the respective sub-tensor using the respective logical sub-array comprises multiplying a respective sub-tensor of the second plurality of sub-tensors and the respective sub-tensor using the respective logical sub-array.

Clause 3: The method according to any one of Clauses 1-2, further comprising: estimating a respective metric for each respective sub-tensor of the first plurality of sub-tensors, wherein mapping the first plurality of sub-tensors to the plurality of logical sub-arrays is performed based on the respective metric.

Clause 4: The method according to any one of Clauses 1-3, wherein estimating the respective metric for each respective sub-tensor of the first plurality of sub-tensors comprises at least one of: determining a size of the respective sub-tensor; determining a number of non-zero inputs in the respective sub-tensor; or determining a number of non-zero inputs in a weight tensor used to process the respective sub-tensor.

Clause 5: The method according to any one of Clauses 1-4, further comprising: determining a respective state of each respective logical sub-array of the plurality of logical sub-arrays, wherein mapping the first plurality of sub-tensors to the plurality of logical sub-arrays is performed further based on the respective states.

Clause 6: The method according to any one of Clauses 1-5, wherein the respective states comprise at least one of: a thermal state of the respective logical sub-array; a damage state of the respective logical sub-array; or an aging state of the respective logical sub-array.

Clause 7: The method according to any one of Clauses 1-6, wherein mapping the first plurality of sub-tensors to the plurality of logical sub-arrays is performed based on a rotating assignment of sub-tensors to sub-arrays.

Clause 8: The method according to any one of Clauses 1-7, wherein mapping the first plurality of sub-tensors to the plurality of logical sub-arrays is performed based on a fixed assignment of sub-tensors to sub-arrays that interleaves non-adjacent sub-tensors of the first plurality of sub-tensors to adjacent logical sub-arrays of the plurality of logical sub-arrays.

Clause 9: The method according to any one of Clauses 1-8, further comprising, for each respective sub-tensors of the first plurality of sub-tensors, loading the respective sub-tensor into a respective buffer associated with the respective logical sub-array prior to processing the respective sub-tensor using the respective logical sub-array.

Clause 10: The method according to any one of Clauses 1-9, further comprising, for each respective sub-tensor of the first plurality of sub-tensors, providing the respective sub-tensor to the respective logical sub-array using a crossbar switch.

Clause 11: The method according to any one of Clauses 1-10, further comprising: identifying an issue in a first logical sub-array of the plurality of logical sub-arrays; refraining from using the first logical sub-array for one or more cycles; and using at least a second logical sub-array of the plurality of logical sub-arrays to process data during the one or more cycles.

Clause 12: The method according to any one of Clauses 1-11, further comprising: identifying a failure in a first logical sub-array of the plurality of logical sub-arrays; and processing at least some of the first plurality of sub-tensors using one or more other logical sub-arrays of the plurality of logical sub-arrays in a serialized manner.

Clause 13: The method according to any one of Clauses 1-12, wherein at least one sub-tensor of the first plurality of sub-tensors is mapped to a logical sub-array in a second MAC array.

Clause 14: The method according to any one of Clauses 1-13, further comprising: after processing each respective sub-tensor using the respective logical sub-array, rearranging output sub-tensors generated by the processing based on an original order of the plurality of sub-tensors in the input data tensor.

Clause 15: A system, comprising: a memory comprising computer-executable instructions; and one or more processors configured to execute the computer-executable instructions and cause the processing system to perform a method in accordance with any one of Clauses 1-14.

Clause 16: A system, comprising: means for performing a method in accordance with any one of Clauses 1-14.

Clause 17: A non-transitory computer-readable medium comprising computer-executable instructions that, when executed by one or more processors of a processing system, cause the processing system to perform a method in accordance with any one of Clauses 1-14.

Clause 18: A computer program product embodied on a computer-readable storage medium comprising code for performing a method in accordance with any one of Clauses 1-14.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   dividing an input data tensor into a first plurality of sub-tensors;
   dividing a physical multiply-and-accumulate (MAC) array into a plurality of logical sub-arrays; and
   for each respective sub-tensor of the first plurality of sub-tensors:
     mapping the respective sub-tensor to a respective logical sub-array of the plurality of logical sub-arrays; and
     processing the respective sub-tensor using the respective logical sub-array.

2. The method of claim 1, further comprising:
   dividing a weight tensor into a second plurality of sub-tensors,
   wherein processing the respective sub-tensor using the respective logical sub-array comprises multiplying a respective sub-tensor of the second plurality of sub-tensors and the respective sub-tensor using the respective logical sub-array.

3. The method of claim 1, further comprising:
   estimating a respective metric for each respective sub-tensor of the first plurality of sub-tensors,
   wherein mapping the first plurality of sub-tensors to the plurality of logical sub-arrays is performed based on the respective metric.

4. The method of claim 3, wherein estimating the respective metric for each respective sub-tensor of the first plurality of sub-tensors comprises at least one of:
   determining a size of the respective sub-tensor;
   determining a number of non-zero inputs in the respective sub-tensor; or
   determining a number of non-zero inputs in a weight tensor used to process the respective sub-tensor.

5. The method of claim 3, further comprising:
   determining a respective state of each respective logical sub-array of the plurality of logical sub-arrays,
   wherein mapping the first plurality of sub-tensors to the plurality of logical sub- arrays is performed further based on the respective states.

6. The method of claim 5, wherein the respective states comprise at least one of:
   a thermal state of the respective logical sub-array;
   a damage state of the respective logical sub-array; or
   an aging state of the respective logical sub-array.

7. The method of claim 1, wherein mapping the first plurality of sub-tensors to the plurality of logical sub-arrays is performed based on a rotating assignment of sub-tensors to sub-arrays.

8. The method of claim 1, wherein mapping the first plurality of sub-tensors to the plurality of logical sub-arrays is performed based on a fixed assignment of sub-tensors to sub-arrays that interleaves non-adjacent sub- tensors of the first plurality of sub-tensors to adjacent logical sub-arrays of the plurality of logical sub-arrays.

9. The method of claim 1, further comprising, for each respective sub-tensors of the first plurality of sub-tensors, loading the respective sub-tensor into a respective buffer associated with the respective logical sub-array prior to processing the respective sub-tensor using the respective logical sub-array.

10. The method of claim 1, further comprising, for each respective sub-tensor of the first plurality of sub-tensors, providing the respective sub-tensor to the respective logical sub-array using a crossbar switch.

11. The method of claim 1, further comprising:
    identifying an issue in a first logical sub-array of the plurality of logical sub-arrays;
    refraining from using the first logical sub-array for one or more cycles; and
    using at least a second logical sub-array of the plurality of logical sub-arrays to process data during the one or more cycles.

12. The method of claim 1, further comprising:
    identifying a failure in a first logical sub-array of the plurality of logical sub-arrays; and
    processing at least some of the first plurality of sub-tensors using one or more other logical sub-arrays of the plurality of logical sub-arrays in a serialized manner.

13. The method of claim 1, further comprising:
    after processing each respective sub-tensor using the respective logical sub-array, rearranging output sub-tensors generated by the processing based on an original order of the plurality of sub-tensors in the input data tensor.

14. The method of claim 1, wherein dividing the physical MAC array comprises logically dividing the physical MAC array based on the first plurality of sub- tensors.

15. A processing system, comprising:
    a memory comprising computer-executable instructions; and
    one or more processors configured to execute the computer-executable instructions and cause the processing system to perform an operation comprising:
       dividing an input data tensor into a first plurality of sub-tensors;
       dividing a physical multiply-and-accumulate (MAC) array into a plurality of logical sub-arrays; and
       for each respective sub-tensor of the first plurality of sub-tensors:
          mapping the respective sub-tensor to a respective logical sub-array of the plurality of logical sub-arrays; and
          processing the respective sub-tensor using the respective logical sub-array.

16. The processing system of claim 15, the operation further comprising:
    estimating a respective metric for each respective sub-tensor of the first plurality of sub-tensors,
    wherein mapping the first plurality of sub-tensors to the plurality of logical sub-arrays is performed based on the respective metric.

17. The processing system of claim 16, wherein estimating the respective metric for each respective sub-tensor of the first plurality of sub-tensors comprises at least one of:
    determining a size of the respective sub-tensor;
    determining a number of non-zero inputs in the respective sub-tensor; or
    determining a number of non-zero inputs in a weight tensor used to process the respective sub-tensor.

18. The processing system of claim 16, the operation further comprising:
    determining a respective state of each respective logical sub-array of the plurality of logical sub-arrays,
    wherein mapping the first plurality of sub-tensors to the plurality of logical sub-arrays is performed further based on the respective states.

19. The processing system of claim 15, wherein mapping the first plurality of sub-tensors to the plurality of logical sub-arrays is performed based on a rotating assignment of sub-tensors to sub-arrays.

20. The processing system of claim 15, wherein mapping the first plurality of sub-tensors to the plurality of logical sub-arrays is performed based on a fixed assignment of sub-tensors to sub-arrays that interleaves non-adjacent sub-tensors of the first plurality of sub-tensors to adjacent logical sub-arrays of the plurality of logical sub-arrays.

21. The processing system of claim 15, the operation further comprising:
    identifying an issue in a first logical sub-array of the plurality of logical sub-arrays;
    refraining from using the first logical sub-array for one or more cycles; and
    using at least a second logical sub-array of the plurality of logical sub-arrays to process data during the one or more cycles.

22. The processing system of claim 15, the operation further comprising:
    identifying a failure in a first logical sub-array of the plurality of logical sub-arrays; and
    processing at least some of the first plurality of sub-tensors using one or more other logical sub-arrays of the plurality of logical sub-arrays in a serialized manner.

23. A non-transitory computer-readable medium comprising computer-executable instructions that, when executed by one or more processors of a processing system, cause the processing system to perform an operation comprising:

dividing an input data tensor into a first plurality of sub-tensors;

dividing a physical multiply-and- accumulate (MAC) array into a plurality of logical sub-arrays; and for each respective sub-tensor of the first plurality of sub-tensors:

mapping the respective sub-tensor to a respective logical sub-array of the plurality of logical sub-arrays; and processing the respective sub-tensor using the respective logical sub-array.

24. The non-transitory computer-readable medium of claim 23, the operation further comprising:

estimating a respective metric for each respective sub-tensor of the first plurality of sub-tensors, wherein mapping the first plurality of sub-tensors to the plurality of logical sub-arrays is performed based on the respective metric.

25. The non-transitory computer-readable medium of claim 24, wherein estimating the respective metric for each respective sub-tensor of the first plurality of sub-tensors comprises at least one of:

determining a size of the respective sub-tensor;

determining a number of non-zero inputs in the respective sub-tensor; or determining a number of non-zero inputs in a weight tensor used to process the respective sub-tensor.

26. The non-transitory computer-readable medium of claim 23, the operation further comprising:

determining a respective state of each respective logical sub-array of the plurality of logical sub-arrays, wherein mapping the first plurality of sub-tensors to the plurality of logical sub-arrays is performed further based on the respective states.

27. The non-transitory computer-readable medium of claim 23, wherein mapping the first plurality of sub-tensors to the plurality of logical sub-arrays is performed based on a rotating assignment of sub-tensors to sub-arrays.

28. The non-transitory computer-readable medium of claim 23, wherein mapping the first plurality of sub-tensors to the plurality of logical sub-arrays is performed based on a fixed assignment of sub-tensors to sub-arrays that interleaves non-adjacent sub-tensors of the first plurality of sub-tensors to adjacent logical sub-arrays of the plurality of logical sub-arrays.

29. The non-transitory computer-readable medium of claim 23, the operation further comprising:

identifying an issue in a first logical sub-array of the plurality of logical sub- arrays;

refraining from using the first logical sub-array for one or more cycles; and using at least a second logical sub-array of the plurality of logical sub-arrays to process data during the one or more cycles.

30. A processing system, comprising:

means for dividing an input data tensor into a first plurality of sub-tensors;

means for dividing a physical multiply-and-accumulate (MAC) array into a plurality of logical sub-arrays;

means for mapping each respective sub-tensor of the first plurality of sub-tensors to a respective logical sub-array of the plurality of logical sub-arrays; and means for processing each respective sub-tensor of the first plurality of sub-tensors using the respective logical sub-array.

* * * * *